(12) United States Patent
Coleman et al.

(10) Patent No.: US 7,953,389 B2
(45) Date of Patent: May 31, 2011

(54) METHOD AND SYSTEM FOR WIRELESS INTRUSION DETECTION, PREVENTION AND SECURITY MANAGEMENT

(75) Inventors: Ryon K. Coleman, Gaithersburg, MD (US); John M. Fossaceca, Frederick, MD (US); William J. Brown, Sykesville, MD (US)

(73) Assignee: 3E Technologies International, Inc., Rockville, MD (US)

( * ) Notice: Subject to any disclaimer, the term of this patent is extended or adjusted under 35 U.S.C. 154(b) by 923 days.

(21) Appl. No.: 11/901,834

(22) Filed: Sep. 19, 2007

(65) Prior Publication Data
US 2008/0102797 A1    May 1, 2008

Related U.S. Application Data

(63) Continuation of application No. 10/773,866, filed on Feb. 7, 2004, now Pat. No. 7,295,831.

(60) Provisional application No. 60/494,615, filed on Aug. 12, 2003.

(51) Int. Cl.
*H04M 1/66* (2006.01)
(52) U.S. Cl. .................. 455/410; 455/456.1; 455/404.2; 455/423; 455/13.3; 455/67.11; 713/166; 726/22; 726/35; 726/17
(58) Field of Classification Search .................. 455/562, 455/424, 67.4; 726/22, 25, 27
See application file for complete search history.

(56) References Cited

U.S. PATENT DOCUMENTS

| | | | |
|---|---|---|---|
| 2,269,340 A | 1/1942 | Gulliksen | |
| 3,120,654 A | 2/1964 | Lee | |
| 3,568,188 A | 3/1971 | Fishbein et al. | |
| 3,641,549 A | 2/1972 | Misek | |
| 3,663,932 A | 5/1972 | Mount | |
| 3,680,092 A | 7/1972 | Scott | |
| 3,680,099 A | 7/1972 | Herman | |
| 3,696,417 A | 10/1972 | Pedersen | |
| 3,711,846 A | 1/1973 | Schlisser | |
| 3,728,721 A | 4/1973 | Lee | |
| 3,733,602 A | 5/1973 | Cuckler | |
| 3,750,163 A | 7/1973 | Hecker | |
| 3,760,400 A | 9/1973 | Galvin | |
| 3,781,773 A | 12/1973 | Ravas | |
| 3,796,989 A | 3/1974 | Ravas | |
| 3,801,980 A | 4/1974 | Danton | |
| 3,805,064 A | 4/1974 | Kornylak | |
| 3,832,709 A | 8/1974 | Klein | |
| 3,845,461 A | 10/1974 | Foreman | |

(Continued)

OTHER PUBLICATIONS

Barry Van Veen, Minimum Variance Beamforming with soft Response Constraints, Sep. 1991, IEEE Transaction on Signal Processing, vol. 39 No. 9, pp. 1964-1972.*

(Continued)

*Primary Examiner* — Charles N Appiah
*Assistant Examiner* — Randy Peaches
(74) *Attorney, Agent, or Firm* — LeSavich High Tech Law Group, P.C.; Stephen LeSavich

(57) ABSTRACT

A method and system for wireless intrusion detection, prevention and security management. The method and system provides autonomous wireless intrusion detection and prevention, with minimal or no operator intervention. The method and system includes a smart wireless radio frequency (RF) antenna subsystem with an adaptive RF beamformer for adaptively and dynamically positioning RF null in a wireless RF transmission beam pattern to block one more rouge wireless network devices from accessing a wireless network such as aboard a military ship.

12 Claims, 7 Drawing Sheets

U.S. PATENT DOCUMENTS

| | | |
|---|---|---|
| 3,878,526 A | 4/1975 | Pedersen |
| 3,896,436 A | 7/1975 | Johnson |
| 3,939,474 A | 2/1976 | Coleman |
| 3,942,178 A | 3/1976 | Hackett |
| 3,955,184 A | 5/1976 | Cinzori |
| 3,967,202 A | 6/1976 | Batz |
| 3,967,258 A | 6/1976 | Bucy |
| 3,981,011 A | 9/1976 | Bell |
| 3,987,428 A | 10/1976 | Todeschin |
| 3,993,995 A | 11/1976 | Kaplan |
| 4,001,822 A | 1/1977 | Sterzer |
| 4,124,848 A | 11/1978 | Clark |
| 4,179,691 A | 12/1979 | Keller |
| 4,195,289 A | 3/1980 | Cole |
| RE30,288 E | 5/1980 | Hackett |
| 4,217,582 A | 8/1980 | Endo |
| 4,224,608 A | 9/1980 | Lederer |
| 4,225,858 A | 9/1980 | Cole |
| 4,286,260 A | 8/1981 | Gershberg |
| 4,310,756 A | 1/1982 | Sick |
| 4,310,836 A | 1/1982 | Stanzani |
| 4,314,239 A | 2/1982 | Odone |
| 4,314,249 A | 2/1982 | Onoe |
| 4,319,332 A | 3/1982 | Mehnert |
| 4,347,512 A | 8/1982 | Sweeney |
| 4,358,756 A | 11/1982 | Morel |
| 4,400,700 A | 8/1983 | Rittenbach |
| 4,499,467 A | 2/1985 | Rittenbach |
| 4,605,922 A | 8/1986 | Blattman |
| 4,692,763 A | 9/1987 | Gregg |
| 4,760,398 A | 7/1988 | Norsworthy |
| 4,837,578 A | 6/1989 | Gammell |
| 4,893,005 A | 1/1990 | Stiebel |
| 4,964,065 A | 10/1990 | Hicks |
| 5,160,915 A | 11/1992 | Kiss |
| 5,196,826 A | 3/1993 | Whiting |
| 5,237,328 A | 8/1993 | Dorey |
| 5,262,783 A | 11/1993 | Philpott |
| 5,376,922 A | 12/1994 | Kiss |
| 5,424,737 A | 6/1995 | Lindell |
| 5,459,468 A | 10/1995 | Hartal |
| 5,486,830 A | 1/1996 | Axline |
| 5,508,704 A | 4/1996 | Hann |
| 5,521,600 A | 5/1996 | McEwan |
| 5,573,012 A | 11/1996 | McEwan |
| 5,682,164 A | 10/1997 | McEwan |
| 5,729,694 A | 3/1998 | Holzrichter |
| 5,760,731 A | 6/1998 | Holmes |
| 5,790,032 A | 8/1998 | Schmidt |
| 5,828,333 A | 10/1998 | Richardson |
| 6,031,482 A | 2/2000 | LeMaitre |
| 6,087,986 A * | 7/2000 | Shoki et al. .................... 342/383 |
| 6,492,933 B1 | 12/2002 | McEwan |
| 6,522,898 B1 * | 2/2003 | Kohno et al. ............. 455/562.1 |
| 6,909,903 B2 | 6/2005 | Wang |
| 7,020,701 B1 | 3/2006 | Gelvin et al. |
| 7,124,197 B2 * | 10/2006 | Ocepek et al. ................ 709/232 |
| 7,257,106 B2 | 8/2007 | Chen |
| 7,269,277 B2 | 9/2007 | Davida et al. |
| 7,295,831 B2 | 11/2007 | Coleman |
| 7,333,482 B2 | 2/2008 | Johansson |
| 7,336,942 B2 | 2/2008 | Wang |
| 7,382,786 B2 | 6/2008 | Chen |
| 7,394,819 B2 | 7/2008 | Chen |
| 7,397,807 B2 | 7/2008 | Chen |
| 7,424,024 B2 | 9/2008 | Chen |
| 7,529,200 B2 | 5/2009 | Schmidt et al. |
| 2003/0027550 A1 | 2/2003 | Rockwell |
| 2003/0028648 A1 | 2/2003 | Calhoun |
| 2003/0153341 A1 | 8/2003 | Crockett |
| 2003/0169752 A1 | 9/2003 | Chen |
| 2003/0217289 A1 | 11/2003 | Ammon |
| 2003/0232598 A1 | 12/2003 | Aljadeff |
| 2004/0047310 A1 | 3/2004 | Chen |
| 2005/0037733 A1 | 2/2005 | Coleman |
| 2005/0073964 A1 | 4/2005 | Schmidt |
| 2005/0089052 A1 | 4/2005 | Chen |
| 2005/0288035 A1 | 12/2005 | Wang |
| 2006/0041431 A1 | 2/2006 | Maes |
| 2007/0005804 A1 | 1/2007 | Rideout |
| 2009/0036159 A1 | 2/2009 | Chen |

OTHER PUBLICATIONS

Partial International Search Report for PCT/US2004/025,926, 2005.
Intelligent Antennas for Wireless Communications—Uplink, R. Michael Buerher, et al. Bell Labs Technical Journal, pp. 73, 103, Jul.-Sep. 1999.

* cited by examiner

TIME T₀

TIME T₁

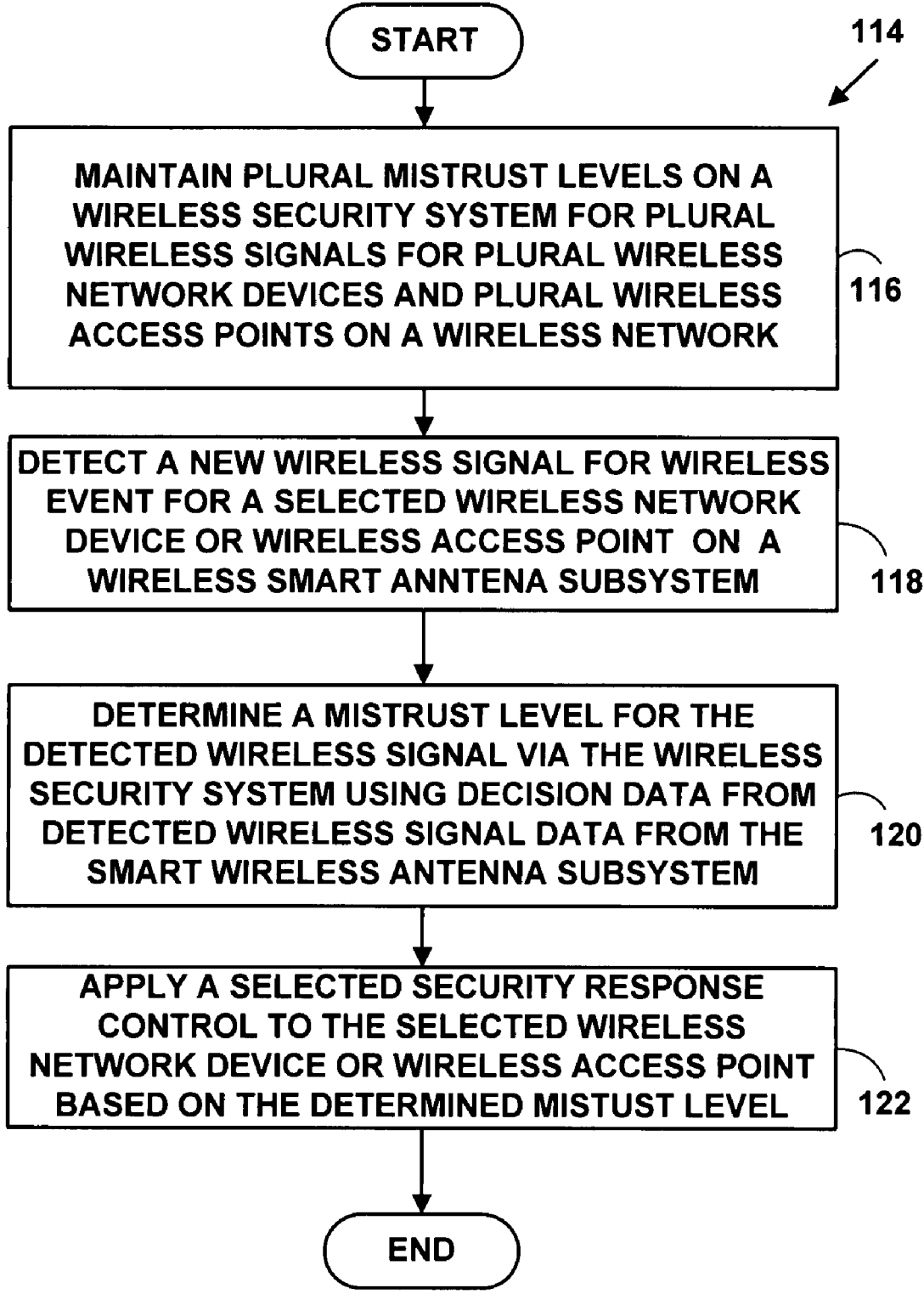

METHOD AND SYSTEM FOR WIRELESS INTRUSION DETECTION, PREVENTION AND SECURITY MANAGEMENT

CROSS REFERENCES TO RELATED APPLICATIONS

This U.S. Application is a Continuation of U.S. application Ser. No. 10/773,866, filed Feb. 7, 2004, that issued as U.S. Pat. No. 7,295,831 that issued on Nov. 13, 2007, that claims priority to U.S. Provisional Application 60/494,615, filed on Aug. 12, 2003, the contents of all of which are incorporated by reference.

U.S. GOVERNMENT RIGHTS

This invention was made, in part or in whole, with U.S. Government support under a SBIR Phase One Contract, SBIR Contract Number N00178-03-C-2012, SBIR Topic Number OSD02-WT02, awarded by the U.S. Navy. The U.S. Government has certain rights in this invention.

FIELD OF THE INVENTION

This invention relates to wireless communications. More specifically, it relates to a method and system for wireless intrusion detection, prevention and security management.

BACKGROUND OF THE INVENTION

There has recently been a big increase in the use of wireless networks such as wireless wide area networks (WiWAN), wireless local area networks (WiLAN), etc. Such wireless networks typically communicate with an Open System Interconnection ("OSI") model Layer 1, Layer 2 and above type wireless protocols specified by the Institute of Electrical and Electronics Engineers (IEEE) 802.11 Working Group, such as 802.11b, 802.11a, 802.11g and others.

As is known in the art, the OSI model is used to describe computer networks. The OSI model consists of seven layers including from lowest-to-highest, a physical (Layer 1), data-link (Layer 2), network, transport, session, presentation and application layer (Layer 7). The physical layer transmits bits over a communication link. The data link layer transmits error free frames of data. The network layer transmits and routes data packets.

The advent of wireless networks has spawned many new types of security threats. Malicious individuals can easily sit outside an organization's premises and, if undetected, freely connect to a wireless network. This is especially undesirable for military and government organizations that routinely need to transmit and receive secret or classified information. A wireless access point (WiAP) may allow an internal, non-protected wireless network to be compromised by unknown and non-trusted users who are simply within an appropriate wireless communication range.

Many traditional security measures are ineffective when applied to wireless networks. Wireless access to networks, for example, cannot easily be monitored and controlled through perimeter defenses such as firewalls and proxy servers.

Existing wireless intrusion detection technology is typically either host-based (e.g., Security Adaptation Manager (SAM), etc.), network-based (e.g., Event Monitoring Enabling Responses to Anomalous Live Disturbances (EMERALD), etc.), or rule-based (e.g., virus checkers and/or Snort IDS, etc.). Many existing wireless intrusion detection systems also rely heavily on manual intervention by network administrators. For example, a network administrator typically needs to interpret log files and manually execute preventative measures to effectively protect wireless networks.

There have been attempts to push the evolution of wireless intrusion detection to include intrusion prevention. However such attempts are typically at least OSI model Layer 2 (e.g., datal-link layer) or Layer 3 (e.g., network layer) and typically lack OSI Layer 1 physical layer Radio Frequency (RF) intrusion prevention for wireless networks.

Thus, it is desirable to provide a physical layer wireless intrusion detection system with an integrated higher level security management system at a data-link layer or above.

SUMMARY OF THE INVENTION

In accordance with preferred embodiments of the invention, some of the problems associated with wireless intrusion, detection and prevention are overcome. A method and system for wireless intrusion detection, prevention and security management is presented.

The method and system provides autonomous wireless intrusion detection and prevention, with minimal or no operator intervention. The method and system includes a smart wireless radio frequency (RF) antenna subsystem with an adaptive RF beamformer for adaptively positioning RF nulls in a wireless RF transmission beam pattern to block one or more rouge wireless network devices from accessing a wireless network.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 9 is a flow diagram illustrating a method of wireless intrusion detection and prevention security.

DETAILED DESCRIPTION OF PREFERRED EMBODIMENTS

Figure 1:
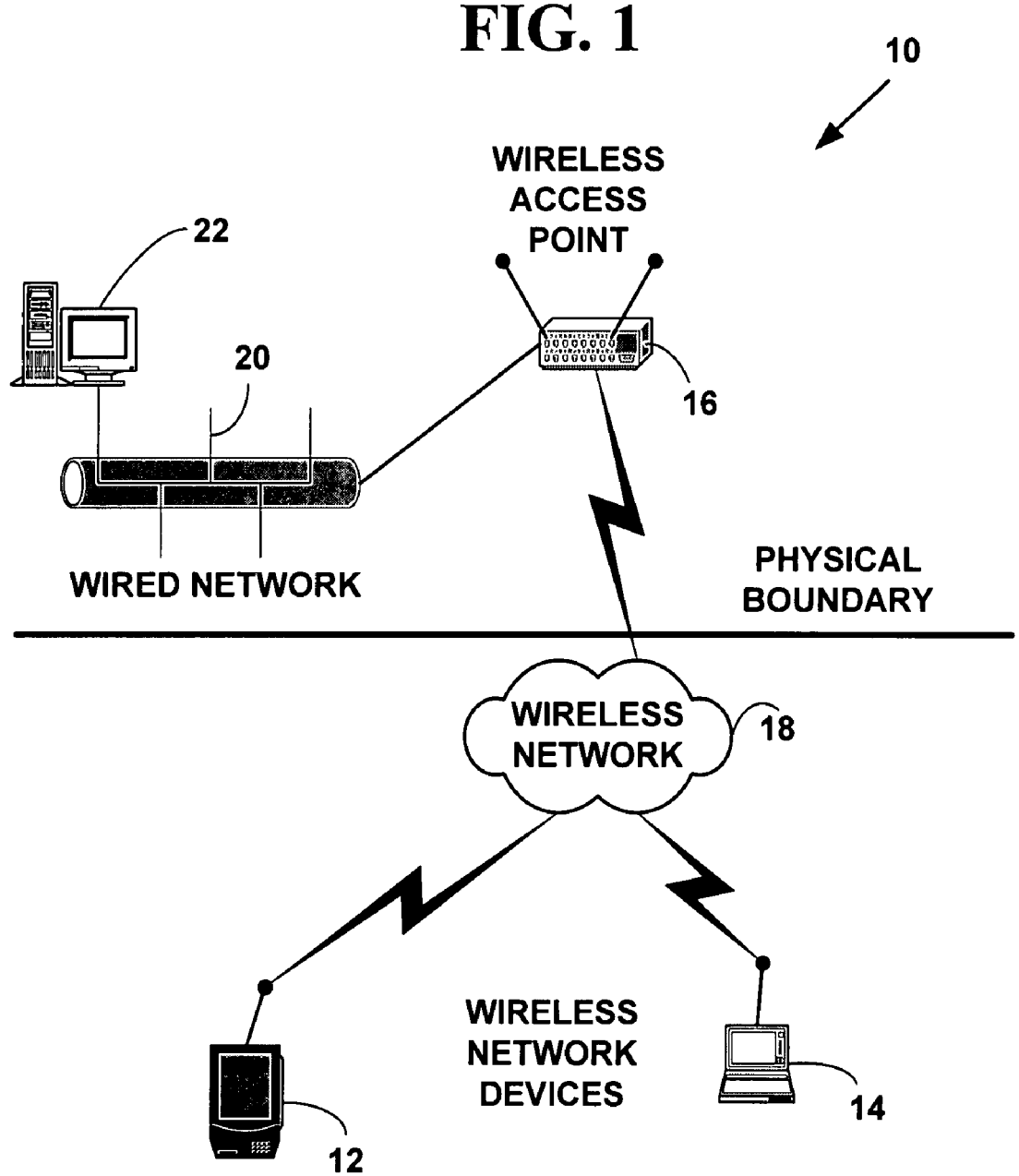
FIG. 1 is a block diagram illustrating an exemplary wireless network system.

FIG. 1 is a block diagram illustrating an exemplary wireless network system 10 with plural network devices. The wireless network system 10, includes, but is not limited to/from, one or more wireless network devices 12, 14, two of which are illustrated, one or more wireless access points (WiAP) 16, one of which is illustrated, to provide wireless access to/from a wireless network (WiNet) 18 to a wired network 20, and a one or more wired network file servers 22, one of which is illustrated. The WiNet 18 includes a WiLAN, WiWAN and other types of wireless networks and is hereinafter referred to as a WiNet 18 for simplicity.

The wireless network devices 12, 14, include, but are not limited to, computers, personal digital/data assistants (PDA), mobile phones, two-way pagers, network appliances, gateways, bridges, routers, and other types of electronic devices capable of connecting to a wireless network.

The wired network 20 includes other types wired network devices (not illustrated). The wireless network devices include one or more types of wireless interfaces with one or more types of wireless protocols. However, the present invention is not limited to these components and more, fewer or other components can also be used to practice the invention.

Preferred embodiments of the present invention include wired and wireless network devices and wireless interfaces that are compliant with all or part of standards proposed by the Institute of Electrical and Electronic Engineers ("IEEE"), International Telecommunications Union-Telecommunication Standardization Sector ("ITU"), Internet Engineering Task Force ("IETF"), U.S. National Institute of Security Technology ("NIST"), American National Standard Institute ("ANSI"), Wireless Application Protocol ("WAP") Forum, or Bluetooth Forum. However, the present invention is not limited to such wired and wireless network devices and wireless interfaces and network devices and wireless interfaces based on other standards could also be used.

IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The NIST standards can be found at the URL "www.nist.gov." The ANSI standards can be found at the URL "www.ansi.org." Bluetooth Forum documents can be found at the URL "www.bluetooth.com." WAP Forum documents can be found at the URL www.wapforum.org.

An operating environment for the components of the wireless network system 10 include a processing system with one or more high speed Central Processing Unit(s) ("CPU") or other types processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system in wireless network system 10.

In one embodiment of the present invention, the wireless interfaces include but are not limited to, IEEE 802.11a, 802.11b, 802.11g, "Wireless Fidelity" ("Wi-Fi"), "World-wide Interoperability for Microwave Access" ("WiMAX"), "RF Home" or "WAP" wireless interfaces. In another embodiment of the present invention, the wireless interfaces, include but are not limited to, a Bluetooth and/or infrared data association ("IrDA") module for wireless Bluetooth or wireless infrared communications. However, the present invention is not limited to such embodiments and other 802.11xx wireless interfaces and other types of wireless interfaces can also be used.

As is known in the art, an 802.11b is a short-range wireless network protocol. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a and provides 20+ Mbps in the 2.4 GHz band. However, other 802.11xx interfaces can also be used and the present invention is not limited to the 802.11 protocols defined. The IEEE 802.11a, 802.11b and 802.11g standards are incorporated herein by reference.

As is known in the art, Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a. More information on Wi-Fi can be found at the URL www.weca.net.

As is known in the art, WiMAX uses the IEEE 802.16a standard for wide-area broadband access. WiMAX networks have a range of up to about 30 miles with data transfer speeds of up to about 70 Mpbs. The IEEE 802.16a standard is incorporated herein by reference. More information on WiMAX can be found at the URL "wimaxforum.org."

As is known in the art, "RF Home" is a standard for wireless networking access devices to both local content and the Internet for voice, data and streaming media in home environments. More information on RF Home can be found at the URL www.homerf.org.

RF Home includes the Shared Wireless Access Protocol ("SWAP"). The SWAP specification defines a new common interface protocol that supports wireless voice and data networking in the home. The RF Home SWAP protocol specification, March 1998, is incorporated herein, by reference.

As is known in the art, the Wireless Application Protocol (WAP) is a communications protocol and application environment for wireless network devices. Wireless Transaction Protocol (WTP) that provides reliable transport for the WAP datagram service and is designed to work with most wireless network infrastructures. The WAP Wireless Application Protocol Architecture Specification, WAP-210-WAPArch-20010712-a and the Wireless Application Environment Specification WAP-236-WAESpec-20020207-a are incorporated herein by reference.

In one embodiment of the present invention, the wireless interfaces are short-range wireless interfaces that are capable of communicating with other wireless devices over a wireless "piconet" or wireless "scatternet" using the wireless communications protocols.

As is known in the art, a "piconet" is a network in which "slave" devices can be set to communicate with a "master" radio controller in one device such as a WiAP 16. Piconets are typically limited to a certain range and vicinity in which wireless devices must be present to operate (e.g., a few feet up to few miles away from the master radio controller). Several "piconets" can be established and linked together in "scatternets" to allow communication among several networks providing continually flexible configurations.

In another embodiment of the present invention, the wireless interfaces include a long-range RF interface used for communicating with wireless devices on wireless networks outside the range of a wireless piconet. In yet another embodiment of the present invention, the wireless interfaces include both short-range and long-range interfaces.

However, the wireless interfaces can be any other or equivalent short-range or long-range wireless interface known in the art and the present invention is not limited to the short-range or long-range wireless interfaces or use the wireless protocols described.

Security and Encryption

The wireless network devices and wireless interfaces (and the wired network devices) include security and encryption functionality. As is know in the art, "encryption" is a process of encoding data to prevent unauthorized access, especially during data transmission. Encryption is usually based on one or more secret keys, or codes, that are essential for decoding, or returning the data to its original readable form.

There are two main types of encryption: "asymmetric" encryption (also called public-key encryption) and "symmetric" encryption. Asymmetric encryption is cryptographic system that uses two keys—a "public key" known to everyone and a "private or secret key" known only to the recipient of the message. "Symmetric encryption" is a type of encryption where the same key is used to encrypt and decrypt the message.

The are encryption protocols that have been specifically designed for wireless network devices. The Wireless Encryption Protocol ("WEP") (also called "Wired Equivalent Privacy") is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access ("WPA") and Robust Security Network ("RSN").

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol ("EAP"). One proposed encryption algorithm is an Advanced Encryption Standard ("AES") encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard ("AES") to keep government information secure. AES is intended to be a stronger, more efficient successor to Triple Data Encryption Standard ("3DES"). More information on NIST AES can be found at the URL www.nist.gov/aes.

As is known in the art, DES is a popular symmetric-key encryption method developed in 1975 and standardized by ANSI in 1981 as ANSI X.3.92, the contents of which are incorporated by reference. As is known in the art, 3DES is the encrypt-decrypt-encrypt ("EDE") mode of the DES cipher algorithm. 3DES is defined in the ANSI standard, ANSI X9.52-1998, the contents of which are incorporated by reference. DES modes of operation are used in conjunction with the NIST Federal Information Processing Standard ("FIPS") for data encryption (FIPS 46-3, October 1999), the contents of which are incorporated by reference.

DES, 3DES and other encryption techniques can be used in the Cipher Block Chaining Mode (CBC). CBC introduces a dependency between data blocks which protects against fraudulent data insertion and replay attacks. In addition, CBC ensures that consecutive repetitive blocks of data do not yield identical cipher text.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified ("SBU") communications. The NIST FIPS Security Requirements for Cryptographic Modules (FIPS PUB 140-2, May 2001) is incorporated by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

Detection of Wireless Intruders

Detecting and preventing an intruder from accessing wireless network system 10 is completed on a wireless Radio Frequency (RF) interface at physical layer (e.g., OSI Layer 1). In order to detect and prevent a rogue intruder or high-gain directional transmitter from interfering with a deployed WiNet 18, a smart-antenna subsystem 24 (FIG. 2) is deployed in association with at one or more wireless access points (WiAP) 16 in a wireless infrastructure for WiNet 18.

The smart-antenna subsystem is comprised of plural components including an adaptive phased array, with digital signal processing that performs a Direction-of-Arrival (DOA) method to identify a direction of a rogue intruder. Once a direction has been computed using the DOA method, a digital signal processor (DSP) is further employed to direct adaptive beamforming, via a RF beamformer using a multiple-element planar or other shaped phased array antenna. Adaptive beamforming effectively blocks out an intruder by selectively placing it in a RF "null" of an RF spectral pattern.

As is known in the art, RF signals typically include an RF spectral pattern with multiple spectral lobes. RF signals are affected by obstructions such as buildings, mountains, etc. Due to the nature of RF signals, an RF transceiver may be located in an RF "null," typically an area between RF lobes in an RF spectral pattern where the RF signal is very weak and not useable for a wireless device.

Figure 2:
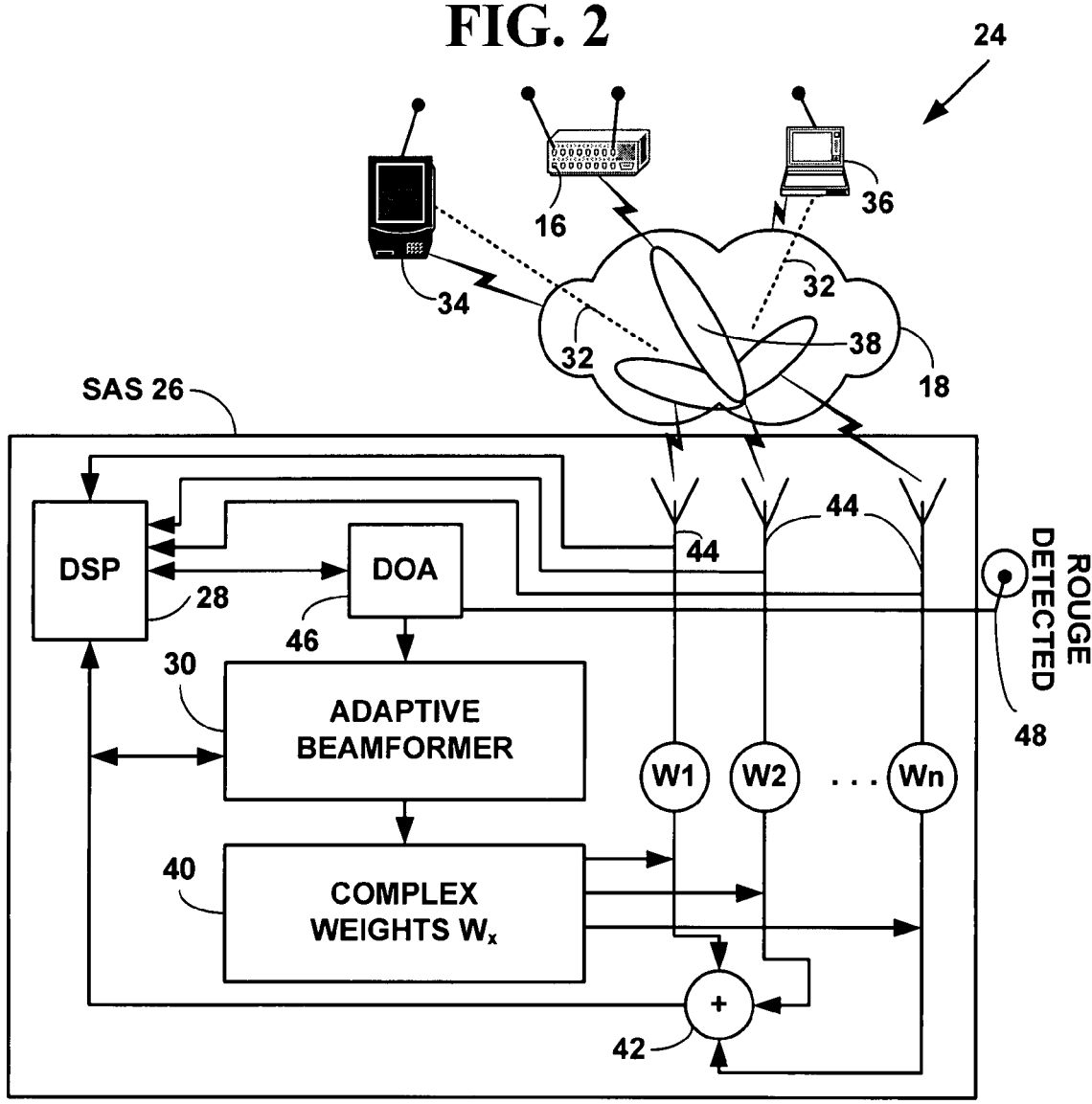
FIG. 2 is a block diagram illustrating an exemplary smart antenna subsystem.

FIG. 2 is a block diagram 24 illustrating a smart antenna subsystem (SAS) 24. The smart antenna subsystem 26 includes plural components including one or more digital signal processors (DSP) 28 to control phases and time delays used in selectively steering a beam via an adaptive RF beamformer 30 and positioning RF nulls 32 effectively to block an intruder 34, 36 (or RF interferer) of an RF transmission pattern 38. The smart antenna subsystem 26 detects and manipulates wireless RF signal patterns at a physical layer (e.g., OSI Layer 1).

The one or more DSPs 28 are also used to control complex weighting factors 40 used by the adaptive beamformer 30. The complex weighting factors 40 are similar to those used in the formation of a Finite Impulse Response (FIR) digital filter. However, other weighting factors 40 can also be used and the present invention is not limited to the complex weighting factors 40 described. A weight summer 42 is used to add the processed signals as is explained below. The smart antenna subsystem 26 also includes plural antenna elements 44.

In one embodiment of the invention, exemplary plural antenna elements 44 are a planar phased array which is formed, for example, by using a 10 by 10 element structure, with each element sized at λ\2 (e.g., where the carrier frequency λ for 802.11b is 2.4 GHz). Therefore the size of the plural antenna elements 44 is roughly 70 cm by 70 cm. However, the invention is not limited to this embodiment and other antennas of other sizes with other structures can also be used.

The smart antenna subsystem 26 uses a DOA 46 method to determine a direction of arrival 48 of any rogue intruder(s) 34, 36 and in turn send the direction to the adaptive beamformer 30, to dynamically place the rogue intruder(s) 34, 36 in RF nulls 32 of the antenna RF transmission pattern 38.

DOA Method

The DOA 46 uses a DOA method that computes angles of arrival of incoming RF signals. This DOA 46 method may have a much higher resolution than methods known in the art that simply scan a beam to find signals above a certain power threshold. However, the present invention is not limited to the DOA method described and other DOA methods can also be used.

Figure 3:
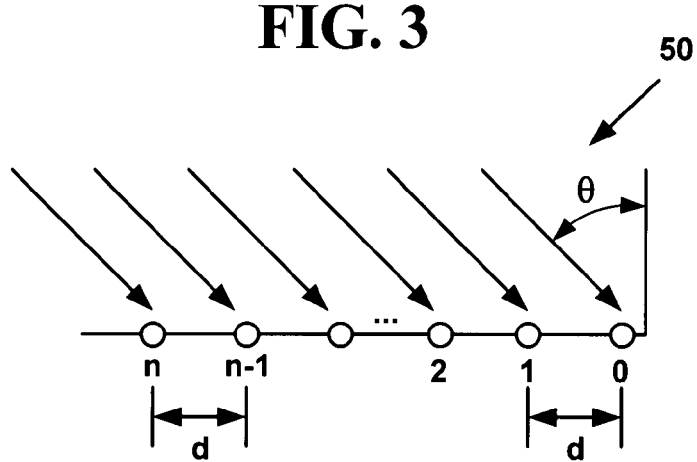
FIG. 3 is a block diagram illustrating an exemplary one dimensional linear array.

FIG. 3 is a block diagram illustrating a one dimensional linear array 50. The time delay τ of an impinging RF signal at element n with respect to an element at an origin is illustrated by Equation 1.

$$\tau = \frac{nd\sin\Theta}{c}, \quad (1)$$

where d is a distance between two signal elements n and n−1 and c is the speed of light.

The signal sampled s by an element n at discrete time k is illustrated in Equation 2, $$X_k[n]=s(kT-\tau_n) \quad (2)$$

where T is the sampling period. If the signal is a digitally modulated baseband signal with symbol period T, the sampled baseband signal at time kT at the nth element is approximated by Equation 3.

$$x_k[n]=s(kT)e^{-j2\pi f \tau_n}+g_k(n), \quad (3)$$

where f is the carrier frequency and $g_k(n)$ is a sample of uncorrelated noise at the $n^{th}$ element. If ρ baseband signals ($s_0(t), s_1(t), K, s_{\rho-1}(t)$) are incident on the array 50 at different angles θ, Equation 3 is extended to Equation 4.

$$\begin{bmatrix} x_k[0] \\ M \\ x_k[N-1] \end{bmatrix} = \begin{bmatrix} e^{-j2\pi f\tau_0^0} & e^{-j2\pi f\tau_0^{\rho-1}} \\ & 0 & \\ e^{-j2\pi f\tau_{N-1}^0} & e^{-j2\pi f\tau_{N-1}^{\rho-1}} \end{bmatrix} \begin{bmatrix} s_0(kT) \\ M \\ s_{\rho-1}(kT) \end{bmatrix} + \begin{bmatrix} g_k[0] \\ M \\ g_k[N-1] \end{bmatrix} \quad (4)$$

In matrix notation Equation 4 is illustrated in Equation 5.

$$x_k = As_k + g_k \quad (5)$$

The columns of the matrix A represent steering vectors of incident signals and form a linearly independent set (i.e., assuming that each signal has a different angle of arrival). A spatial correlation matrix $R_{xx}(k)$, which describes how the signals are correlated is illustrated by Equation 6.

$$R_{xx}(k) = E[x_k x_k^H], \quad (6)$$

where E[ ] is the expectation operator and $x_k^H$ is the Hermitian transpose of $x_k$. For p signals incident on the array, $R_{xx}(k)$ includes p large eigenvalues compared to the rest of the (N-p) eigenvalues. The eigenvectors corresponding to those eigenvalues span a signal subspace. The remaining eigenvectors corresponding to the eigenvalues span a noise subspace and are orthogonal to the eigenvectors in the signal subspace.

The steering vectors corresponding to the p signals span a same subspace as the eigenvectors corresponding to the p largest eigenvalues and hence are also orthogonal to the eigenvectors in the noise subspace. Hence, by finding the p steering vectors that are the most orthogonal to the noise subspace, direction of arrival angles can be calculated for the p signals. This method is referred to as a MUltiple SIgnal Classification (MUSIC) method and provides a very high degree of resolution.

Adaptive Beamforming Method

The adaptive beamformer 30 includes an exemplary RF beamformer method that comprises at least: (1) multiple antenna elements 44; (2) complex weighting factors 40 to amplify/attenuate and delay signals from each antenna element 44; and (3) a weight summer 42 to add all the processed signals, in order to tune out RF signals not of interest (SNOI), while enhancing RF signals of interest (SOI) (See 38, FIG. 2) as directed by DSP 28.

However the present invention is not limited to these components or the RF beamformer method described and other components and RF beamformer methods can also be used to practice the invention.

For the linear array 50 of FIG. 2, the received signal vector $x_k$ in Equation 5 is multiplied by a complex weight w, a magnitude of which represents a gain/attenuation and a phase of which represents a delay or shift. The weighted elements are then summed to form the adaptive beamformer 30 output $y_k$ as is illustrated in Equation 7.

$$y_k = w^H x_k \quad (7)$$

Weights are obtained using an adaptive beamformer 30. The DOA 46 passes DOA information to the adaptive beamformer 30, which in turn dynamically and adaptive designs an RF radiation pattern with the main RF beam 38 directed toward the SOI and RF nulls 32 toward the SNOI's. In one embodiment of the invention, the adaptive beamforming 30 includes a Minimum Variance Distortionless Response (MVDR) method whose weights $w^H$ are calculated as illustrated in Equation 8. However, the present invention is not limited to the adaptive beamforming method illustrated in Equation 8 and other adaptive beamforming methods can also be used to practice the invention.

$$W^H = W_{MVDR} = \frac{R_{xx}^{-1}(n)A}{A^H R_{xx}^{-1}(n)A}, \quad (8)$$

where $A^H$ is a Hermitian transpose of a steering matrix.

An unprotected WiNet 18 is inherently vulnerable to the risk of signal detection and interception. The smart antenna subsystem 26 illustrated in FIG. 2 allows a rogue intruder 34, 36 to be detected at a physical layer (e.g., OSI Layer 1) and selectively placed in a RF null 32 of an RF antenna pattern 38, effectively blocking the rogue intruder 34, 36 from interfering with the WiNet 18.

Figure 4:
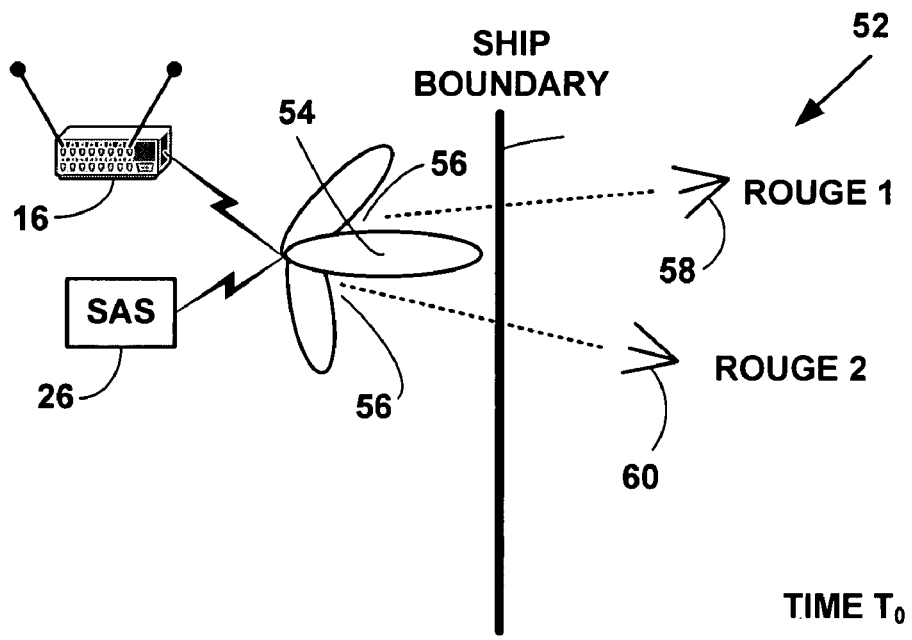
FIG. 4 is a block diagram illustrating an exemplary RF null beam pattern.

FIG. 4 is a block diagram 52 illustrating an exemplary RF beam pattern 54 at time $T_0$. For example, on a WiNet 18 on a U.S. Navy ship, includes a WiAP 16 that is transmitting an RF pattern with a main RF beam 54 including plural lobes and plural RF nulls 56. An adaptive beamformer 30 in the smart antenna subsystem 26 associated with the WiAP 16 is used to dynamically and adaptively design an RF pattern with a narrower main beam 54 and a larger number of RF nulls 56. These RF nulls 56 are dynamically and adaptively placed to defeat multiple rogue intruders 58, 60 and successfully protect the RF integrity of the WiNet 18 at time $T_0$.

Figure 5:
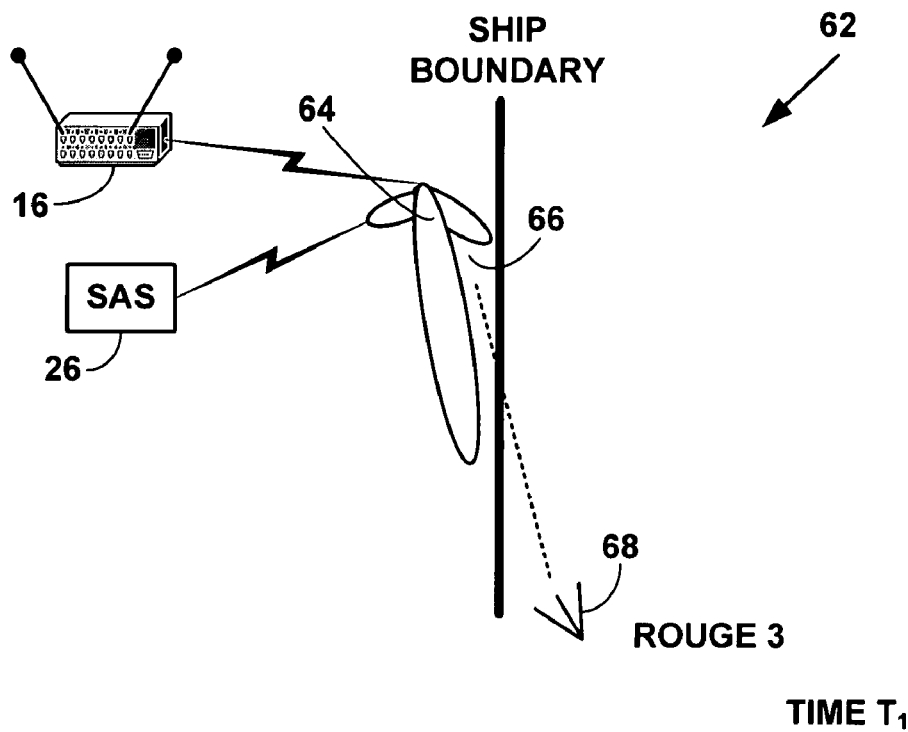
FIG. 5 is a block diagram illustrating another exemplary RF null beam pattern.

FIG. 5 is a block diagram 62 illustrating another exemplary RF beam pattern 64 at time $T_1$. The same WiNet 18 on the same U.S. Navy ship is now being attacked by a single rouge intruder. A new RF beam pattern 64 is dynamically and adaptively reformed by the smart antenna subsystem 26 at the shipboard WiAP 16. The phases of the antenna array 44 of the smart antenna subsystem 26 are adjusted to adaptively and dynamically reform RF nulls 66 which are positioned in the direction of a new single rogue intruder 68, effectively blocking it from interfering with the shipboard WiNet 18.

A new RF beam pattern 64 is dynamically and adaptively reformed. If a new rouge intruder 68 at time $T_1$ enters the scenario and is detected by the DOA 46, the original RF beam pattern 54 (FIG. 4) is reformed to place the new intruder 68 within a new RF null 66 of the new RF beam pattern 64.

Wireless Intrusion Detection and Prevention Security System

Figure 6:
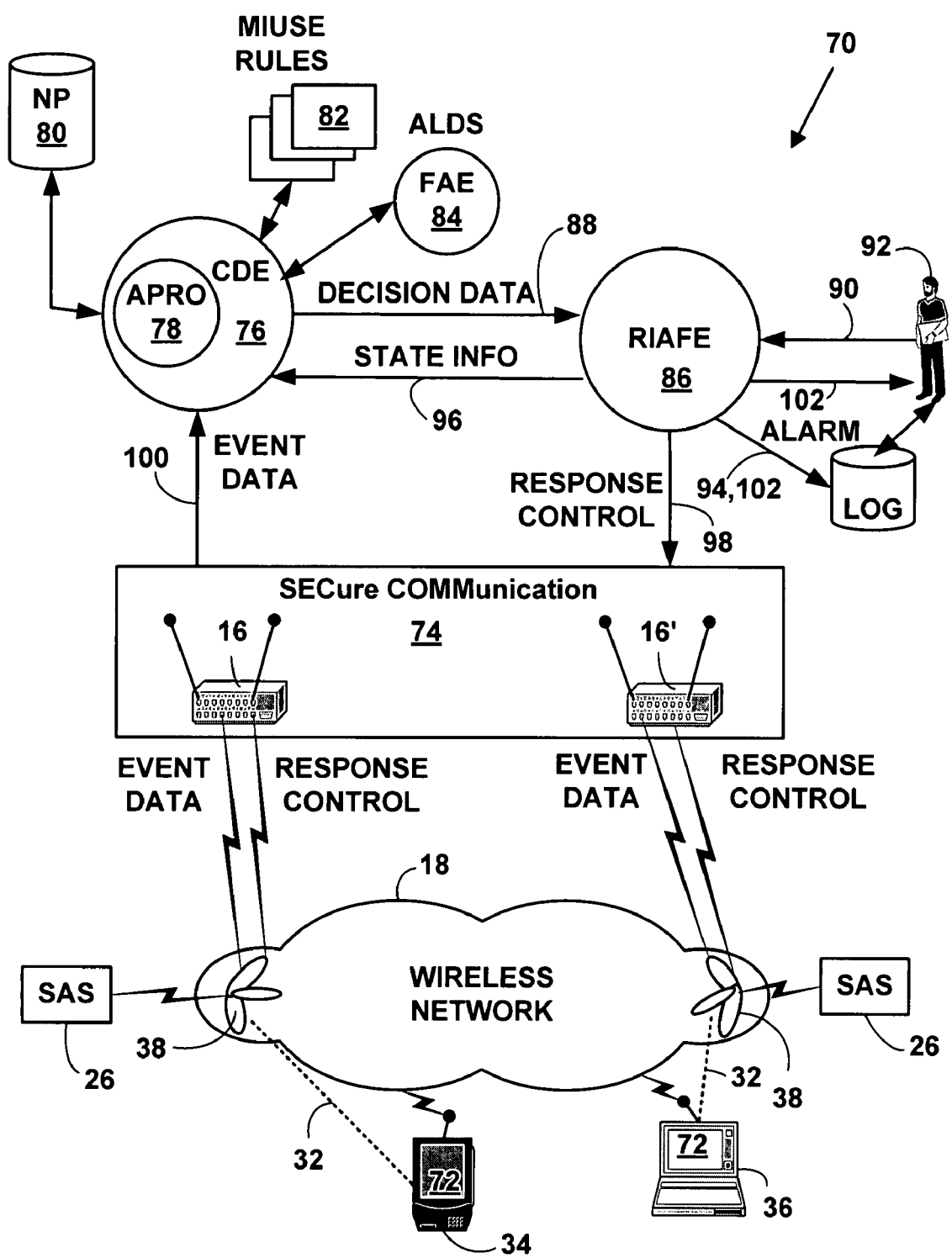
FIG. 6 is a block diagram illustrating an exemplary wireless intrusion detection and prevention system.

FIG. 6 is a block diagram illustrating an exemplary wireless intrusion detection and prevention system 70. The smart wireless antenna subsystem 26 (FIG. 2) which detect RF signals at a physical layer (e.g., OSI Layer 1) is combined with a wireless intrusion prevention system 70 at a data-link layer (OSI Layer 2) to form an integrated wireless security management platform.

The wireless network-based wireless intrusion prevention system 70 includes, but is not limited to the following components: plural monitor/distributed agents (MDA) 72 installed on plural on a wireless network devices 34, 36, a SECure COMMunication (SEC COMM) link 74, Cooperative Decision Engine (CDE) 76 with a wireless event anomaly profiler (APRO) 78, a normal wireless event profile (NP) database 80, wireless event misuse rules 82, fuzzy association engine (FAE) 84, and a response initiator/adaptive feedback engine (RIAFE) 86. However, the invention is not limited to these components and more, fewer or other components can also be used.

The smart antenna subsystem 26 detects and manipulates wireless RF signals at the physical layer and is integrated with the wireless intrusion detection and prevention system 70 which operates at the data link layer.

The monitor/distributed agents (MDA) 72 are client applications installed on the plural wireless network devices 34, 36 that collect wireless event data 100 from the plural wireless network devices 34, 36 and send the event data 100 to the SEC COMM 74 via one or more WiAPs 16, 16'. Wireless devices 34, 36 without the MDA 72 client applications installed can be immediately identified as rouge intruders and denied access to the WiNet 18. However, the present invention can provide wireless security to a wireless network with or without MDA 72.

The SEC COMM 74 provides secure communications between the wireless network devices 34, 36 and the other components wireless network-based wireless intrusion prevention and detection system 70. The secure communications include one or more of the wireless security protocols, security methods and/or encryption techniques described above.

The CDE 76 collects wireless event data 100 and looks for normal wireless events and abnormal wireless events using a wireless event anomaly profiler 78, wireless normal event profile database 80, wireless event misuse rules 82 as is explained below. The FAE 84 is used to provide an adaptive learning detection system (ALDS) in association with the CDE 76 as is explained below. The CDE 76 sends decision data 88 to the RIAFE 86 based on processed wireless event data 100.

The RIAFE 86 receives decision data 88 from the CDE 76 and optionally manual control 90 from a network administrator 92. The RIAFE 86 sends alarms 102 and log files 94 to the network administrator 92, state information 96 to the CDE 76, and response control 98 to the WiAPs 16 through the SEC COMM link 74.

The RIAFE 86 maintains a running mistrust level for each wireless network device 36, 38 and each WiAP 16, 16' in the WiNet 18 based on WiNet 18 traffic/event data 100 received at CDE 76. Based on the confidence metric and the type of anomaly detected (e.g., received as decision data from the CDE 76), different attacks are assigned different weights.

For example, a detected RF anomaly is assigned weight a whereas a digital signature mismatch is assigned a different weight β. The mistrust level of network devices 34, 36 and WiAPs 16, 16' is initialized to zero, then incremented and/or decremented by the RIAFE 86.

Based on incremental thresholds in the mistrust levels, the RIAFE 86 sends various preprogrammed response actions that determine the response(s) taken by the WiAPs 16, 16' or wireless network devices 32, 36 in question. Table 1 illustrates exemplary mistrust levels and corresponding response controls issued by the RIAFE 86. Exemplary security protection suites are described in Table 2 below. However the present invention is not limited to the mistrust levels, response controls in Table 1 or security protection suites illustrated in Table 2 and more, fewer or other mistrust levels, response controls or security protection suites can also be used to practice the invention.

TABLE 1

| Mistrust Level | Response Mechanism |
| --- | --- |
| 0 | Continue normal operation using security protection suite 1. |
| 1 | Cycle to security protection suite 2 (advanced encryption standard (AES), electronic code book (ECB), message digest version 5 (MD5), Diffe-Hillman (DH) gr. 2, keyed hashed message authentication code (HMAC) MD5). |

TABLE 1-continued

| Mistrust Level | Response Mechanism |
| --- | --- |
| 2 | Cycle to security protection suite 3 (AES CBC, secure hash algorithm (SHA)-512, DH gr. 5, HMAC SHA-512). |
| 3 | Switch RP band from A (e.g., 2.4 GHz) to B (e.g., 5 GHz), where A and B user-configurable. |
| 4 | Exclude from network, command device to re-authenticate and re-login/Cycle to security protection suite 3 or other security protection suite. |

For example when a mistrust level threshold for a particular wireless network device (e.g., 36) reaches level four, then the wireless network device 36 in question is commanded to re-authenticate itself to the WiNet 18. If a successful session is established, then security protection suite number three is invoked and the wireless network device in question (e.g., 36) is observed for a fixed period of time. The exact amount of time is included as a parameter in each one of the protection suites. There are at least three supported security protection suites, which will be explained below.

Once this security protection-suite-specific period of time has elapsed and no new wireless anomalies were reported during the time period for the given device (e.g., WiAP 16 or wireless network device 36), then a mistrust level for that wireless network device 36 or WiAP 16 is decremented. Similarly, all the other wireless network devices 38 and WiAPs 16', once their threshold level is greater than zero, are tracked by the RIAFE 86.

If no further anomalies are detected for a particular network device for the time period "$T_x$" contained in the security protection suite, then the mistrust level for that wireless network device 36 is decremented. Level four is the most extreme mistrust level maintained, at which point the wireless network device 36 is excluded from the WiNet 18 and re-authentication must occur before the wireless network device 36 can re-join.

Security protection suites" are used which are dynamically cycled as the mistrust level thresholds change. These security protection suites include at least an encryption method, a secure hash method, a Diffie-Hellman (DH) group method, a method of encryption key authentication and a mistrust level decrement value.

Security protection suites are used in the SEC COMM link 74 to/from the wireless network device 36 and the WiAP 16. A timeout value, the "Mistrust Level Decrement Interval" is also included as a protection suite parameter to control decrementation, or stabilization, of the running mistrust levels maintained for each WiAP 16, 16' and wireless network device 36, 38. Exemplary security protection suites are defined as is illustrated in Table 2. However, the present invention is not limited to the security protection suites in Table 2 and other security protection suites with more, fewer or other elements can also be used.

TABLE 2

Protection Suite #1:

Encryption: 3DES cipher block chaining (CBC) 192-bit
Hashing: SHA-1
Diffie-Hellman: DH group 1 (768 bit prime)
Keyed Authentication: HMAC SHA-1
Mistrust Level Decrement 104 Interval: (x) minutes
Where (x) is user-configurable.

TABLE 2-continued

Protection Suite #2:

Encryption: AES ECB 128-bit
Hashing: MD5
Diffie-Hellman: DH group 2 (1024 bit prime)
Keyed Authentication: HMAC MD5
Mistrust Level Decrement 104 Interval: (x + 5) minutes
Protection Suite #3:

Encryption: AES CBC 128-bit
Hashing: SHA-512
Diffie-Hellman: DH group 5 (1536 bit prime)
Keyed Authentication: HMAC SHA-512
Mistrust Level Decrement 104 Interval: (x + 15) minutes The RIAFE 86 also routinely distributes the list of WiAPs 16 and wireless network devices 34, 36 in the WiNet 18 with corresponding mistrust levels in the form of log files 94 to the network administrator 92. When any mistrust level reaches or exceeds the value of three, an alarm 102 is issued to the network administrator 92 in addition to an automated response action. However, the network administrator 92 is not required to take any manual action 90. The precise mistrust level at which the alarm is raised (e.g., default=three) is programmable for optimal tuning to actual observed behavior and desired sensitivity.

The network administrator 92 is able to manually roll-back or zeroize an accumulated mistrust level for any particular WiAP 16 or wireless network device 36, 38, following due diligence and inspection. This incorporates a dimension of human control to the automated architecture and permits further system optimization and system training. However, manual intervention 90 is not required.

The security protection suites one through three listed above in Table 2 range from most straightforward, computationally inexpensive, and relatively least secure (e.g., protection suite #1), to computationally most expensive and most secure (e.g., protection suite #3). The longer mistrust level decrement interval associated with the higher numbered protection suites also ensures a stronger level of protection is provided when higher mistrust level thresholds are reached.

A tradeoff is involved between wireless network bandwidth and security. When protection suite three is invoked and operational, security overhead can reach levels approaching about 50% of the wireless network bandwidth. For this reason, it is desirable to normally operate at mistrust levels corresponding to protection suite two or one for increased actual network throughput. However, if mistrust levels are consistently high, it is reasonable to assume that anomalous activity is occurring, and network bandwidth should be sacrificed in order to achieve adequate security and to prevent intrusions.

As shown in FIG. 6, the state information 96, include a list of mistrust levels for each WiAP 16 and wireless network device 36, 38 in the WiNet 18, is sent from the RIAFE 86 to CDE 76. The CDE 76 is able to consider the accumulated mistrust levels for each wireless network device 36, 38, which introduces feedback 96, 98, 100 into the CDE 76 and assists by providing further evidence for anomaly analyses.

This feedback paths also allow the network administrator 92 to have a control path into the CDE 76 for the WiNet 18 through manual adjustment of the mistrust levels. This introduces the issue of a trusted and well-trained network administrator 92 required to guide the operation. However, manual feedback 90 is not required. If no network administrator 92 manual feedback 90 is given, the method and system will continue to operate effectively according to its own embedded control functions and methods.

As shown in FIG. 6, decision data 88 is sent from the CDE 76 to RIAFE 86. The decision data 88 that is transferred is specified to facilitate modeling and implementation of the response initiator. The decision data 88 includes at least the following data illustrated in Table 3. However, the present invention is not limited to the decision data illustrated in Table 3 and more, fewer or other decision data 88 can also be used.

TABLE 3

X, Y coordinates for a physical location of the device/
monitor agent application 72, wireless network device 36,
38 or WiAP 16 where a wireless anomaly has been detected.
Confidence level (e.g., real number between zero and one)
in the detected wireless anomaly.
Type of wireless anomaly
Mistrust level decrement interval 104 from a security protection suite (Table 2).

Although the type of wireless anomaly can be very broad because it is essentially defined as any event which is "anomalous" or different from normal network traffic behavior, class of wireless anomaly type can generally be grouped into a category which is assigned a weighting factor α (which ranges from one for low-grade anomalies such as a single ping event to three for a stronger anomaly such as an RF anomaly.

Also, the confidence metric is quantitative. In one embodiment of the invention, the confidence level is a real number between zero and one, and is used by the RIAFE 86 as a multiplier. However, the present invention is not limited to such a confidence level and other confidence levels can also be used. The confidence level corresponding to the detected anomaly for that wireless network device is multiplied by the weighting factor that is assigned to the corresponding detected anomaly, and the result is added to the existing mistrust level for the given wireless network device 36, 38 to arrive at the new mistrust level. A decrement value is also included. The mistrust level is adjusted according to Equation 9.

$$M_{new} = M + \alpha\beta - M_{dec\_val}, \qquad (9)$$

where $M_{new}$ is a new mistrust level, M is an old mistrust level, α is a confidence level in a detected anomaly, β is a weight assigned to the type of anomaly and, $M_{dec\_val}$ is a mistrust level decrement value.

Figure 7:
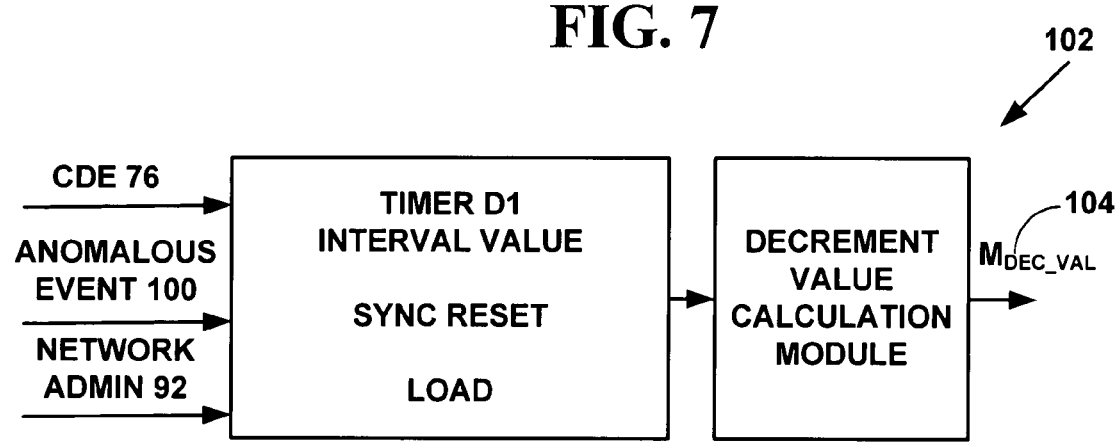
FIG. 7 is a block diagram illustrating a graphical representation of a mistrust level decrement control.

FIG. 7 is a block diagram illustrating a graphical representation of the mistrust level decrement control 102 of Equation 9 including $M_{dec\_val}$ 104. In general, the multiplication result αβ will not be an integer, therefore M becomes a real number. The integer threshold values of M are tracked in asserting the proper response action 98, according to Table 1.

As is illustrated in FIG. 7, mistrust level decrementing is accomplished based on three parameters, described as follows: (1) a decrement timer D1 exceeds a mistrust level decrement interval from the operational protection suite; (2) mistrust level four has been reached, the wireless network device 36, 38 successfully re-authenticates, and re-login is also successful; (3) manual intervention 90 from the network administrator 92.

A decrement timer D1 is maintained on the RIAFE 86 for each WiAP 16 or wireless network device 36, 38 in the WiNet 18 whose mistrust level exceeds zero. The decrement timer is reset whenever an anomalous event occurs at the given wireless network device, or when the operational protection suite is cycled. The mistrust level is decremented in the following way: if the decrement timer exceeds the mistrust level decrement interval from the operational protection suite, or if mistrust level four has been reached and the wireless network device 36, 38 successfully re-authenticates and there is successful login on the wireless network device, then the mistrust level for that device is decremented by one.

At any time, the network administrator 92 may manually reset the mistrust level for a given wireless network device 36, 38 or WiAP 16 to any value. Through these specific mechanisms, the mistrust levels are selectively decremented by the RIAFE 86 and wireless network devices 34, 36 or WiAP 16 can return to a stable, innocuous condition if anomalous events cease to occur.

The mistrust level decrement value is calculated within the normal range of mistrust levels (e.g., M<4) using CDE 76 inputs is illustrated with the pseudo code in Table 4. However, the invention is not limited to this calculation and other calculations can also be used to practice the invention.

TABLE 4

```
( synchronous_reset = 1 ) or (timer = 0) then //start of timer
{
    M_dec_val <= 0;
    M_t1 <= M;
}
else if ( Period = T ) then //timer has expired
{
    M_t2 <= M;
    if ( M_t1 = M_t2 ) and ( M_t1 > 1 ) then
        M_dec_val = 1;
    else M_dec_val = 0;
}
```

In Table 4, $M_{t1}$ is a value of mistrust level M when the timer is zeroized and $M_{t2}$ is the value of the mistrust level when the timer reaches the protection suite expiration value.

The above pseudo-code in Table 4 illustrates that a mistrust level is decremented if the decrement timer exceeds the mistrust level decrement interval from the operational protection suite and no new anomalies have been detected in that time period for the particular wireless network device 36, 38.

The method and system is able to achieve dynamic, pro-active intrusion prevention because in particular, the RIAFE 86 transmits its state information including running mistrust levels to the CDE 76 in a feedback loop 96, 98, 100 which allows for more precise decision analyses that take into account a priori decision information from previous time intervals.

The network administrator 92 is able to manually adjust 90 the mistrust levels and thereby guide operational flow if so desired. However, manual adjustment 90 is not typically necessary.

A parameter, the mistrust level decrement time interval, is included in each protection suite to control the response initiator in decrementing the mistrust levels and providing network stabilization in the absence of anomalies over time. The security protection suites themselves control the encryption method, the hash method, the Diffie-Hellman group, and the method of key authentication used in the SEC COMM link 74 from the wireless network device 36, 38 to the WiAP 16 in the protected WiNet 18.

Pro-active intrusion prevention is achieved by dynamic switching or cycling of these protection suites according to the running mistrust levels. If a mistrust level of three is reached, more drastic intrusion prevention measures are taken, including switching of the RF band, for example, for 802.11b from 2.4 GHz to 5 GHz. This sends an alarm notification 102 to the network administrator 92.

If mistrust level four is reached for a given device, that wireless network device 36, 38 or WiAP 16 is forced off of the WiNet 18 and must re-authenticate to the WiNet 18 to participate. In this way, a full range of intrusion prevention measures is provided.

These mistrust levels help control the response activities of the protected WiNet 18. The RIAFE 86 is able to manage the running mistrust levels and dispatch control actions to the WiAPs 16 and wireless network devices 34, 36 in a time-sensitive manner which facilitates real intrusion prevention as an aspect of the architecture.

Adaptive Learning Detection System

The method and system includes an Adaptive Learning Detection System (ALDS) that utilizes an approach to detecting RF anomalies and potentially other types of anomalies in a WiNet 18. The efficacy of the ALDS is predicated upon the hypothesis that wireless intruders will emit RF transmissions that affect the overall measurable signal strength.

As is known in the art, signal strength can be used to estimate the position of a mobile wireless network device. Such technologies have been implemented by industry for cell phones and 802.11a/b/g systems amongst others. Usually, such RF location systems estimate the position of the wireless network device by taking measurements of RF signals emitted from the wireless network device at several different angles; or conversely, the wireless network device will measure the received signal strength from several emitters which are in fixed, known positions. During operation the position of the wireless network device is constantly calculated and re-estimated very often.

If a rogue wireless network device or RF transmitter exists in the area, the RF signal strengths will be affected and the measurements will be skewed by the emissions of the rogue RF emitter, thus introducing anomalies into the readings. Unfortunately, passive observation of these measurements will not immediately reveal that there is anomalous behavior. An analytic and adaptive system is required to look at large amounts of data over time to determine statistically that there may be an anomaly present in the readings and thereby alert the users to presence of a potential wireless intruder.

The RF location system will estimate the position of the wireless network device on a regular basis. This position may tend to "shift" even if the wireless network device is actually stationary due to regular RF effects. If a wireless intruder is present and emitting in the area of a particular wireless network device, the wireless network device's position shift readings will be affected. One possibility is that the variance of the readings may increase. Another possibility is that the wireless network device's position reading may be farther from the wireless network device's actual position.

The ALDS system is capable of detecting such anomalies over time. Another innovation is the addition of periodic "known" location checks. This will allow actual physical positions to be compared with estimated positions. This data is fed into the ALDS and used to identify anomalies which may be indicative of the presence of a wireless intruder. There are two major classes of intrusion detection systems (IDS): (1) those based on known attack signatures from past confirmed misuse events, and (2) those based on anomalous network activity, which varies from normal or historically observed traffic patterns. The problem of implementing one or the other technique is that the IDS is then "static", that is, the IDS can detect known attack signatures but not those that are close to the known attack with some slight malicious deviation.

In the present invention, a fuzzy system including fuzzy association engine 84 (FIG. 6) including the ALDS as described is combined with the CDE 76 and rule-based signatures 82 and is used for intrusion detection by the wireless intrusion detection and prevention system 70.

Learning based and fuzzy logic systems are typically superior and allow the method system to detect variations on the known attacks or intentional obfuscation. The combination of misuse-rule 82 based decision logic and the ALDS fuzzy association engine 84 at the heart of the CDE 76 allows detection and prevention several classes of anomalous events. These include: detection of vulnerability probes—monitoring for a potential attacker probing or "sniffing" the WiNet 18; network scanners—attempts to detect Transmission Control Protocol (TCP) services; host scanners—attempts to detect hosts on the WiNet 18; vulnerable services and exploits—detection of weaknesses and publicly accessible services; Trojans and rootkits—used to established an operation within the host or cause disruption; and Denial of Service (DoS)/Distributed Denial of Service (DDoS) attacks—resource depleting attacks, worms and viruses.

The method and system is also designed to detect and prevent emerging areas of attack, including: (1) Insider threats—Many IDS's are outward looking, however threats and attacks may also come from inside. It is difficult to classify and categorize this type of behavior using traditional IDS. The fuzzy association engine 84 and built in learning base, is able to develop anomaly profiles to thwart these threats; and (2) Mobile Code—Mobile code software modules are designed, employed, distributed, or activated with the intention of compromising the performance or security of information systems and computers, increasing access to those systems, providing the unauthorized disclosure of information, corrupting information, denying service, or stealing resources. One of the major difficulties in detecting and preventing attacks lies in the ability to devise computational methods and methods which are capable of extracting from network traffic data whether or not an attack is occurring.

Often live network traffic does not lend itself to deterministic methods of analysis for various types of attacks or intrusions. For this reason, the method and system utilizes the ALDS which is capable of processing noisy wireless network traffic and event data which is formatted by the anomaly profiler 78 with information from the normal profile database 80. The fuzzy association engine 84 outputs an analysis which is utilized by the CDE 76, which dispatches decision data 88 to the RIAFE 86 for potential response control action 98. The fuzzy association engine 84 processes a non-linear noisy set of data, and is adaptive and capable of machine learning. Neural networks work well with noisy data, as is typical in a WiNet 18, and do not depend on human insight 92 for manual training 90 which could otherwise incorrectly bias the system.

The field of intrusion detection and prevention is typically predicated on the notion that various measurements of characteristics can be made on network traffic and that if an "anomalous" or "suspicious" event (or collection and analysis of distributed events) occurs this would be detectable in the observed measurements.

However, writing deterministic rules to detect this anomaly is difficult if not impossible over varied cases. Often a "Fuzzy Logic" or "Neural Network System" utilizing supervised learning would be employed to detect anomalous conditions. Typically, Supervised Learning involves presenting a set of training data to a suitable Neural Network (NN) system. Usually, this training set involves both "positive" and "negative" data. "Positive" data would be data which is indicative of "normal" network activity. "Negative" data would be scenarios which indicate "anomalous" or suspicious network activity. The Neural network is "trained" by adjustment of internal weights which connect the "perceptrons" or "nodes" of the Neural network. Once trained, the Neural network runs in operational mode and provides a regular output indicating either normal or anomalous activity.

Much research has been carried out on network intrusion detection and to some extent, network intrusion prevention. However, due to the inherent nature of wireless technology, (wide open radiation, ease of eavesdropping, vulnerability to DOS attacks, etc.) the study of new techniques for wireless intrusion detection and prevention has proved to be an urgent and thought provoking challenge.

The method and system involves training a Back-Propagation Neural Network (NN) with only "positive" training data. The NN outputs a measurable quantity vs. a "condition" or "probability." However, the present invention is not limited to only positive training data and negative training data and positive and negative training together can also be used to practice the invention.

Using positive training data, instead of the NN determining that there is an anomaly or that the condition is normal, the NN provides a prediction of the location of a wireless network device 36, 38. The NN is calibrated with an input training vector of the following form illustrated by Equation 10.

$$(SS_{Cn}, X_p, Y_p, SS_{Cn}, X_q, Y_q, SS_{Cn}, X_r, Y_r, SS_{Cn}, X_s, Y_s, X_{Cn}, Y_{Cn}), \quad (10)$$

where $SS_{Cn}$=signal strength measured at a particular WiAP 16 for a particular wireless network device 36 in a particular position $(X_{Cn}, Y_{Cn})$ and where $X_p, X_q, X_r, X_s$ are an x location of a particular WiAP 16, p, q, r or s, and where $Y_p, Y_q, Y_r, Y_s$ are a y location of a particular WiAP 16, and $X_{Cn}, Y_{Cn}$ are coordinates of a wireless network device 36.

Equation 10 is illustrated with four WiAPs 16 p, q, r and s. However, the present invention is not limited to four WiAPs 16 and more or fewer WiAPs can also be used to practice the invention.

In the above scenario, there are four WiAP 16 units, p, q, r and s. There is a wireless network device wireless network device Cn 36, which is at a particular coordinate $(X_{Cn}, Y_{Cn})$.

The Back-Propagation Neural network (BPNN) is put into training mode and presented with a set of input training vectors of the form illustrated by Equation 11.

$$(SS_{Cn}, X_p, Y_p, SS_{Cn}, X_q, Y_q, SS_{Cn}, X_r, Y_r, SS_{Cn}, X_s, Y_s, X_{Cn}, Y_{Cn}) \quad (11)$$

Once the BPNN is trained, it is used to periodically predict the location of a given wireless network device 36. The output is calculated, or predicted, as $(X_{Pn}, Y_{Pn})$. As stated before, under an attack condition, it is assumed that there will be some anomalous RF condition. Under normal conditions $X_{Pn}$ is approximately equal to $X_{An}$ and $Y_{Pn}$ is approximately equal to $Y_{An}$. When the BPNN is run in operational mode, an error value can be computed as is illustrated in Equation 12.

$$\text{error}=(X_{Pn}-X_{An}, Y_{Pn}-Y_{An}) \quad (12)$$

where $(X_{An}, Y_{An})$ is an actual coordinate of the wireless network device.

The error value of Equation 12 should be close to zero if the (X,Y) coordinate is one of the original training values. If the error exceeds a certain empirically determined threshold, then an anomalous condition is likely to be present and responsive action will be taken.

As was discussed above the method and system includes a normal profile database 80, an anomaly profiler 78 associated with a CDE 76 which are employed to activate the RIAFE 86 upon the output from the fuzzy association engine 84 (e.g., the BPNN) that an anomalous network condition exists. The RIAFE 86 is employed to isolate the WiAPs 16 and/or individual wireless network devices 34, 36 which are most severely impacted by these detected anomalies, and to take additional active intrusion prevention measures undertaken by the monitor/distributed agent 72.

The method and system provides periodic location "recalibration". That is, at various known, marked locations, provisions are made to send a signal back to central file server 22 (FIG. 1) such that the server 22 will be able to compare "actual" location to "predicted" location. This serves a twofold purpose: (1) allows periodic retraining of the ALDS neural network in the intrusion detection and prevention system 70; and (2) allows ALDS to determine if positional readings are getting significantly skewed.

The ALDS system is also able to predict the general location of a wireless intruder by identifying which specific WiAPs 16 are experiencing anomalous effects and which are experiencing normal effects. This information can be used to isolate the general vicinity affected by the wireless intruder's transmissions and allow the network operator 92 to quickly investigate where the source of the RF anomaly may be emanating from.

The ALDS is coupled with a misuse-rule base 82 to provide both an expert system subcomponent and a "learning based" system subcomponent CDE 76. The CDE 76 with the ALDS provides decision data 88 to the RIAFE 86 which was described above.

Wireless Intrusion Detection Method

Figure 8:
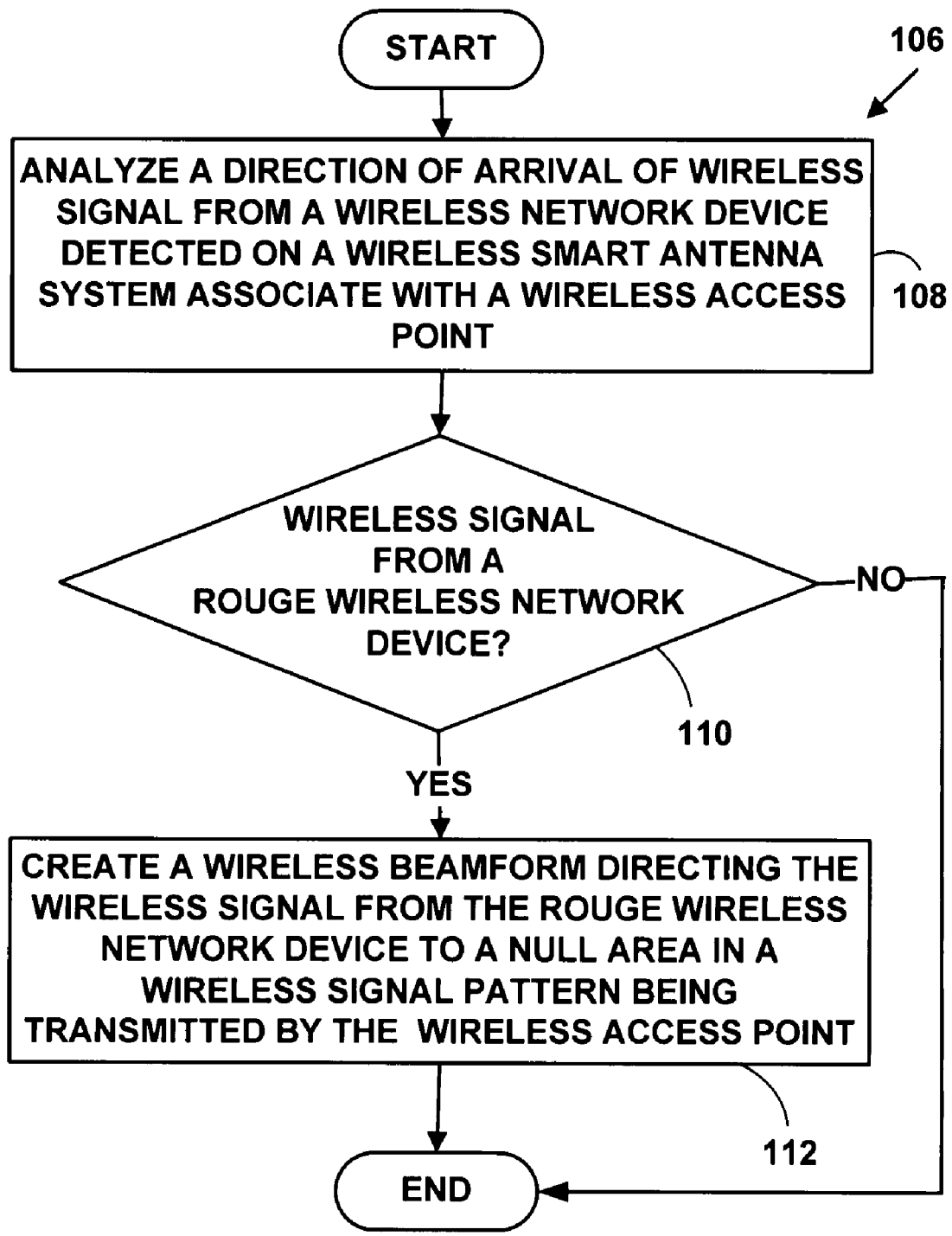
FIG. 8 is a flow diagram illustrating a method of wireless intrusion detection and prevention.

FIG. 8 is a flow diagram illustrating a Method 106 of wireless intrusion detection. At Step 108, a direction of arrival of a wireless signal from a wireless network device is detected on a wireless smart antenna subsystem associated with a wireless access point. At Step 110, the direction of arrival is analyzed to determine whether the wireless signal is from a rouge wireless network device. If the wireless signal is from a rouge wireless network device, at Step 112 a wireless beamform is adaptively and dynamically created directing the wireless signal from the rouge wireless network device to a null area in a wireless signal pattern being transmitted by the wireless access point. Wireless intrusion detection is done at physical layer.

Method 106 is illustrated with an exemplary embodiment. However, the present invention is not limited to this exemplary embodiment and other embodiment can also be used to practice the invention.

In such an exemplary embodiment at Step 108, a direction 66 of arrival of a RF wireless signal from a wireless network device 36 is detected on a smart antenna subsystem 26 with a DOA 46. The smart antenna subsystem 26 is associated with a WiAP 16. At Step 110, the direction 66 of arrival is analyzed to determine whether the RF wireless signal is from a rouge wireless network device 36. If the RF wireless signal is from a rouge wireless network device 36, at Step 112 a RF wireless beamform 38 is adaptively and dynamically created with adaptive beamfomer 30 directing the wireless signal from the rouge wireless network device 36 to a RF null area 38 in a RF wireless signal pattern 38 being transmitted by the WiAP 16.

Wireless Intrusion Detection and Protection Security Method

FIG. 9 is a flow diagram illustrating a Method 114 of wireless intrusion detection and protection security. At Step 116, plural mistrust levels are maintained for a plural wireless signals for plural wireless network devices and for plural wireless access points on a wireless network by a wireless security system. At Step 118, a new wireless signal is detected for a wireless event for a selected wireless network device or wireless access point by a smart wireless antenna subsystem. At Step 120, a mistrust level is determined for the detected wireless signal via the wireless security system using decision data created from the detected wireless signal data from the smart wireless antenna subsystem. At Step 122, the mistrust level is used to apply a selected security response control action to the rouge wireless network device or wireless access point from the wireless security system (e.g., by changing protection suites, switching wireless bands, requiring re-authentication and/or identification, forcing the rouge wireless network device or wireless access point off the wireless network, or directing it to a wireless null in the wireless signal pattern, etc.).

Method 114 is illustrated with an exemplary embodiment. However, the present invention is not limited to this exemplary embodiment and other embodiment can also be used to practice the invention.

In such an exemplary embodiment at Step 116, plural mistrust levels (e.g., Table 1) are maintained for a plural wireless signals for plural wireless network devices 34, 36 and plural WiAPs 16, 16' on a wireless network 18 by a wireless intrusion detection and prevention system 70 (wireless security system 70). At Step 118, a new wireless signal is detected for wireless event (e.g., normal or abnormal wireless event) for a selected wireless network device 36 or a WiAP 16 by a smart wireless antenna system 26. At Step 120, a mistrust level (e.g., Table 1) is determined for the detected wireless signal via the wireless security system 70 using decision data 88 (Table 3) created from the detected wireless signal data from the smart wireless antenna subsystem 26. Decision data 88 can also include information obtained from not only from data-link layer but higher layers as well (e.g., network layer or higher information). At Step 122, the mistrust level is used to apply a selected security response control action 98 (Tables 1 and 2) to the rouge wireless network device 36 or WiAP 16 from the wireless security system 70. (e.g., by changing security protection suites, switching RF bands, by requiring re-authentication and/or identification, by forcing the rouge wireless network device 36 or rouge WiAP 16 off the WiNet 18 or directing it to a RF null 32 in the RF signal pattern 38 with the smart antenna subsystem 26).

The method and system described provides autonomous wireless intrusion detection and prevention, with minimal operator intervention. The method and system integrates a physical layer (e.g., OSI Layer 1) smart radio frequency (RF) antenna subsystem 44 with data-link layer (e.g., OSI Layer 2) or higher wireless security management platform 70.

It should be understood that the programs, processes, methods and system described herein are not related or limited to any particular type of computer or network system (hardware or software), unless indicated otherwise. Various combinations of general purpose, specialized or equivalent computer components including hardware, software, and firmware and combinations thereof may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more fewer or equivalent elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A smart wireless antenna subsystem providing intrusion detection and prevention, comprising in combination:
   one or more digital signal processors for controlling phases and time delays used in selectively steering a wireless radio frequency (RF) transmission beam pattern via an adaptive RF beamformer;
   an adaptive RF beamformer for adaptively and dynamically positioning RF nulls in the wireless RF transmission beam pattern to block one or more wireless network devices from accessing a wireless network,
   wherein the adaptive RF beamformer includes complex weighting factors to process incoming RF signals from a plurality of wireless antenna elements and a signal weight summer to add up processed RF signals to enhance RF signals of interest and ignore RF signals not of interest,
   wherein the adaptive RF beamformer dynamically and adaptively directs a selected rouge wireless network device or a selected rouge wireless access point to a wireless RF null in a wireless signal pattern with the smart wireless antenna subsystem;
   a direction of arrival detector for computing angles of arrival of incoming RF signals from the one or more wireless network devices and for passing the computed angles of arrival of the incoming RF signals to the adaptive RF beamformer; and
   a plurality of wireless antenna elements for receiving a plurality of wireless RF signals from the one or more wireless network devices via the wireless network, for passing the plurality of wireless RF signals to the direction of arrival detector and for sending wireless RF signals created by adaptive RF beamformer to the one or more wireless network devices,
   thereby providing an automated wireless network intrusion detection and prevention system for dynamically and adaptively detecting wireless device intruders to the wireless network and preventing the wireless device intruders from interfering with the wireless network.

2. The smart wireless antenna subsystem of claim 1 wherein, the direction of arrival detector calculates a direction of arrival of an RF signal with:

$$R_{xx}(k)=E[x_k x_k^H],$$

wherein $R_{xx}(k)$ is a spatial correlation matrix, $x_k$ is an RF signal sampled at discrete time k, E[ ] is an expectation operator and $x_k^H$ is a Hermitian transpose of $x_k$.

3. The smart wireless antenna subsystem of claim 1 wherein an output from the adaptive beamformer includes:

$$y_k = w^H x_k,$$

wherein $y_k$ is an RF signal vector output at discrete time k, $w^H$ are complex weight factors and $x_k$ is a received RF signal vector input at discrete time k.

4. The smart wireless antenna subsystem of claim 3 wherein the adaptive beamformer calculates the complex weight factors $w^H$ with a Minimum Variance Distortionless Response method comprising:

$$\omega^H = \frac{R_{xx}^{-1}(n)A}{A^H R_{xx}^{-1}(n)A},$$

wherein $R_{xx}^{-1}(n)A$ is an inverse of a spatial correlation matrix $R_{xx}$, n is sampled wireless signal element and $A^H$ is a Hermitian transpose of a steering matrix.

5. The smart wireless antenna subsystem of claim 1 wherein the smart wireless antenna subsystem is used at a physical layer in an infrastructure for the wireless network.

6. The smart wireless antenna subsystem of claim 5 wherein the physical layer is an Open Systems Interconnection Layer 1 physical layer.

7. The smart wireless antenna subsystem of claim 1 wherein the wireless smart wireless antenna subsystem operates at a data-link layer or higher layer in a wireless network infrastructure on a wireless network.

8. The smart wireless antenna subsystem of claim 7 wherein the data-link layer is an Open Systems Interconnection Layer 2 data-link layer or higher layer.

9. A smart wireless antenna subsystem providing intrusion detection and prevention, comprising in combination:
   one or more digital signal processors for controlling phases and time delays used in selectively steering a wireless radio frequency (RF) transmission beam pattern via an adaptive RF beamformer;
   an adaptive RF beamformer for adaptively and dynamically positioning RF nulls in the wireless RF transmission beam pattern to block one or more wireless network devices from accessing a wireless network,
   wherein the adaptive RF beamformer includes complex weighting factors to process incoming RF signals from a plurality of wireless antenna elements and a signal weight summer to add up processed RF signals to enhance RF signals of interest and ignore RF signals not of interest, and
   a direction of arrival detector for computing angles of arrival of incoming RF signals from the one or more wireless network devices and for passing the computed angles of arrival of the incoming RF signals to the adaptive RF beamformer; and
   a plurality of wireless antenna elements for receiving a plurality of wireless RF signals from the one or more wireless network devices via the wireless network, for passing the plurality of wireless RF signals to the direction of arrival detector and for sending wireless RF signals created by adaptive RF beamformer to the one or more wireless network devices,
   thereby providing an automated wireless network intrusion detection and prevention system for dynamically and adaptively detecting wireless device intruders to the wireless network and preventing the wireless device intruders from interfering with the wireless network on the military ship,
   wherein the smart wireless antenna subsystem is included on a military ship to adaptively and dynamically block one or more different rouge wireless network devices from accessing a wireless network on the military ship.

10. A smart wireless antenna subsystem providing intrusion detection and prevention, comprising in combination:
   one or more digital signal processors for controlling phases and time delays used in selectively steering a wireless radio frequency (RF) transmission beam pattern via an adaptive RF beamformer;
   an adaptive RF beamformer for adaptively and dynamically positioning RF nulls in the wireless RF transmission beam pattern to block one or more wireless network devices from accessing a wireless network,
   wherein the adaptive RF beamformer includes complex weighting factors to process incoming RF signals from a plurality of wireless antenna elements and a signal weight summer to add up processed RF signals to enhance RF signals of interest and ignore RF signals not of interest, and a direction of arrival detector for computing angles of arrival of incoming RF signals from the one or more wireless network devices and for passing the computed angles of arrival of the incoming RF signals to the adaptive RF beamformer; and a plurality of wireless antenna elements for receiving a plurality of wireless RF signals from the one or more wireless network devices via the wireless network, for passing the plurality of wireless RF signals to the direction of arrival detector and for sending wireless RF signals created by adaptive RF beamformer to the one or more wireless network devices, thereby providing an automated wireless network intrusion detection and prevention system for dynamically and adaptively detecting wireless device intruders to the wireless network and preventing the wireless device intruders from interfering with the wireless network, wherein the smart wireless antenna subsystem is included on a military ship to adaptively and dynamically block one or more different rouge wireless access points from accessing a wireless network on the military ship.

11. A smart wireless antenna subsystem providing intrusion detection and prevention, comprising in combination:

means for controlling phases and time delays used in selectively steering a wireless radio frequency (RF) transmission beam pattern via a means for adaptively and dynamically positioning RF nulls in the wireless RF transmission beam pattern;

means for adaptively positioning RF nulls in the wireless RF transmission beam pattern to block one or more wireless network devices from accessing a wireless network, wherein complex weighting factors are used to process incoming RF signals from a means for receiving a plurality of wireless RF signals from the one or more wireless network devices via the wireless network and a signal weight summer to add up processed RF signals to enhance RF signals of interest and ignore RF signals not of interest;

means for computing angles of arrival of incoming RF signals from the one or more wireless network devices and for passing the computed angles of arrival of the incoming RF signals to the means for means for receiving a plurality of wireless RF signals from the one or more wireless network devices via the wireless network;

means for receiving a plurality of wireless RF signals from the one or more wireless network devices via the wireless network, for passing the plurality of wireless RF signals to the means for computing angles of arrival of incoming RF signals from the one or more wireless network devices and for sending wireless RF signals created by the means for adaptively and dynamically positioning RF nulls in the wireless RF transmission beam pattern to block one or more wireless network devices from accessing the wireless network from the one or more wireless network devices;

means for including the smart wireless antenna subsystem on a military ship to adaptively and dynamically block one or more different rouge wireless network devices from accessing the wireless network on the military ship, thereby providing an automated wireless network intrusion detection and prevention system for dynamically and adaptively detecting wireless device intruders to the wireless network and preventing the wireless device intruders from interfering with the wireless network.

12. The smart wireless antenna subsystem of claim 11 wherein the smart wireless antenna subsystem is used at a physical layer in an infrastructure for the wireless network.

* * * * *